US012794971B1

(12) United States Patent
Paul et al.

(10) Patent No.: US 12,794,971 B1
(45) Date of Patent: Nov. 10, 2026

(54) GLOBAL DISTRIBUTED COUNTERS

(71) Applicant: CLOUDFLARE, INC., San Francisco, CA (US)

(72) Inventors: Aditi Paul, Sunnyvale, CA (US); Bradley Roland Swenson, Skokie, IL (US); Peter David Sutherland, London (GB); Robert Sutter, Amsterdam (NL)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 19/438,294

(22) Filed: Dec. 31, 2025

(51) Int. Cl.
*H04L 67/1001* (2022.01)

(52) U.S. Cl.
CPC .............................. *H04L 67/10015* (2022.05)

(58) Field of Classification Search
CPC ................................................ H04L 67/10015
See application file for complete search history.

(56) References Cited

U.S. PATENT DOCUMENTS 8,719,804 B2 * 5/2014 Jain .................... G06F 11/3495 717/127
8,856,397 B1 * 10/2014 Marshak .............. G06F 3/0689 710/16
9,411,656 B2 * 8/2016 Jindal ................... G06F 9/5083
9,690,842 B2 * 6/2017 Plevyak .............. G06F 16/2255
10,372,504 B2 * 8/2019 Shotton ................. H04L 67/535
11,243,898 B2 * 2/2022 Hansson ............. G06F 13/1663
2007/0005256 A1 * 1/2007 Lincoln .................. G16H 50/80 702/19
2025/0044986 A1 * 2/2025 Segev ................... G06F 3/0679

* cited by examiner

*Primary Examiner* — Alex Tran
(74) *Attorney, Agent, or Firm* — NICHOLSON DE VOS WEBSTER & ELLIOTT LLP

(57) ABSTRACT

A first compute server at a first level of a node tree within a data center receives a plurality of write requests. The first compute server forwards a first state update representing the plurality of write requests to a second compute server that is a parent of the first compute server in a second level of the node tree. The second compute server generates a second state update by aggregating the first state update with additional state updates from other child compute servers and forwards it to a third compute server. The third compute server is a parent of the second compute server in a third level of the node tree. The third compute server determines a global state for a counter associated with the write requests based on the second state update and additional regional states from other data centers and propagates the global state down the node tree.

21 Claims, 3 Drawing Sheets

GLOBAL DISTRIBUTED COUNTERS

FIELD

Embodiments of the invention relate to the field of network communications, and more specifically, to implementing global distributed counters for requests across data centers in a distributed network.

BACKGROUND

Hosts of networked resources are concerned with maintaining high security, performance, and reliability, such as applications and web resources (e.g., websites). As the popularity of a resource increases, so does the amount of network traffic that is directed to the origin server hosting the resource. This increase in traffic can place significant strain on computing resources, leading to degraded performance and diminished user experience. Compounding this issue is the distributed nature of modern networks, where requests can originate from multiple geographic regions.

SUMMARY

Embodiments of the invention provide systems and methods for maintaining globally consistent distributed counters across multiple data centers in a cloud computing network. The system addresses challenges of scalability, correctness, and low-latency synchronization by organizing compute servers into a hierarchical node tree. At the first level, compute servers act as ingress points for counter operations, processing raw increment and decrement requests and maintaining local caches of counter data structures. These compute servers transmit updates upstream to parent nodes in batched form to minimize network overhead. At the second level, intermediate compute servers aggregate incoming state updates from their child nodes at the first level and forward consolidated updates upstream to regional leaders at a third, highest level of the hierarchical node tree. At the third level, the regional leader aggregates state from all child compute servers within its region and exchanges state information with peer regional leaders to compute a global counter state. The regional leaders can maintain counters as conflict-free replicated data types (CRDTs), such as positive/negative (PN) counters, and selects the maximum of the incoming and current values before applying the delta. This can ensure atomicity and correctness, allowing multiple retries without risk of duplicate counting in scenarios involving transient network failures or connection loss between child compute servers and regional leaders. Regional leaders also perform similar max-merge and delta operations when processing updates received from peer regions, thereby ensuring eventual consistency across the global network.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
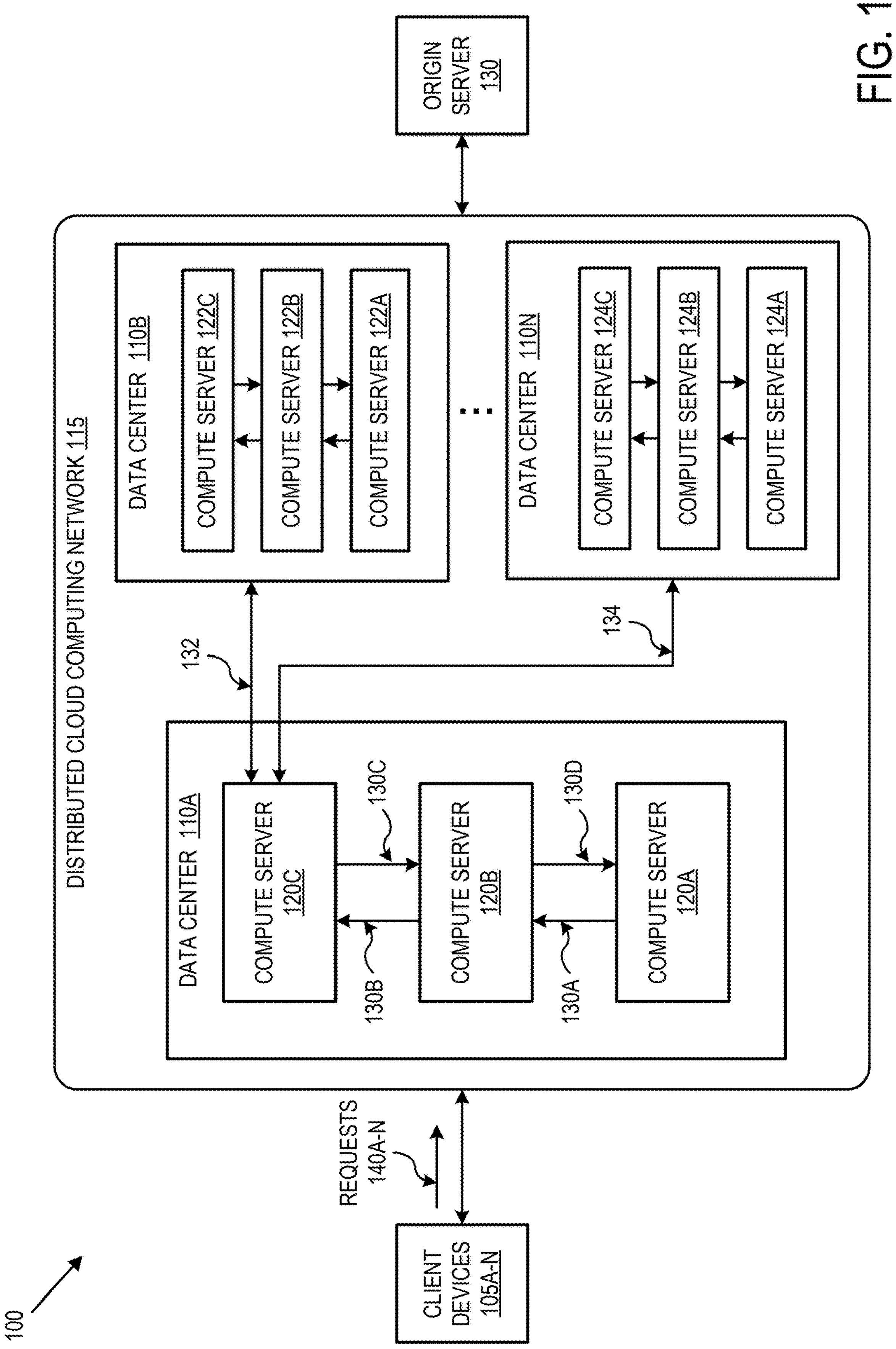
FIG. 1 illustrates an exemplary networked system according to some embodiments described herein.

Origin servers host resources that are accessible by client devices that make requests that are received and processed at intermediary edge server, or compute servers, such as those providing content delivery network (CDN) or other performance and/or security services. For instance, compute servers of a distributed cloud computing network may receive and process requests for the resources on behalf of the origin servers. In distributed cloud computing environments, maintaining an accurate global count of active entities such as user sessions or resource usage presents significant technical challenges. Increment and decrement operations may originate from numerous geographically dispersed nodes, making centralized counting impractical without introducing high latency. Furthermore, clients require near real-time access to the latest global count to make admission decisions, such as whether to allow a new connection or session. Existing solutions often fail to meet these requirements due to limitations in scalability, correctness, and performance, and due to network partitions within a region and/or globally, as they can result in stale or inconsistent counts. Additional complexity can arise when users migrate between colocation facilities or regions during a session, which can lead to duplicate counting or loss of state.

The embodiments described herein provide mechanisms that enable low-latency, globally consistent counting across a distributed architecture while ensuring correctness. The compute servers that receive the requests are at a first, lowest level of a hierarchical node tree within a data center. The compute servers at this first level maintain a local cache of counter data structures, each indexed by a unique counter identifier. These compute servers are configured to process incoming requests by incrementing or decrementing the count value associated with a specific key in accordance with the incoming requested operation. The system implements a replication process that propagates a counter state from child compute servers to parent compute servers within the hierarchical node tree of the data center. This parent compute server aggregates the counter values from each of its one or more child compute servers and propagates it to a third, highest level of the hierarchical node tree where a compute server acts as a regional leader for a particular region. The regional leader communicates with other regional leaders to share the current status of its own state. Each regional leader derives the global state by aggregating state updates received from its peer nodes with its own locally maintained state. The regional leader then propagates the global state down the hierarchical node tree to all the child compute servers within each data center.

Embodiments of the invention provide many technical advantages, in addition to addressing the deficiencies of previous solutions. For example, rather than transmitting individual write requests, the system uses different synchronization strategies based on the tier of the compute server. The first compute server layer accumulates raw increments or decrements and sends updates representing the total incremental changes since the last synchronization. These updates are transmitted upstream within the hierarchical node tree in batched form to minimize network overhead and ensure scalability. Upon receiving a write request, the second layer of compute servers similarly merges and aggregates updates from their children and synchronizes the aggregated totals upstream. The third layer of compute servers use CRDT max-merge semantics to reconcile state incoming from its children and exchange state information with peers using a gossip protocol to achieve eventual consistency. Downstream propagation occurs after global state computation, ensuring that all tiers maintain synchronized counter values. This replication strategy provides fault tolerance, minimizes bandwidth consumption, and supports rapid convergence of global state across distributed regions.

FIG. 1 illustrates an exemplary networked system 100 according to some embodiments described herein. The exemplary networked system 100 illustrated in FIG. 1 includes a distributed cloud computing network 115 situated between client devices 105A-N and an origin server 130.

Examples of client devices 105A-N include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, client devices 105A-N each execute a client network application that is capable of transmitting and/or receiving network traffic. For example, the client network application may be a web browser or other application that can send requests to access and display network resources (e.g., web pages, images, word processing documents, PDF files, movie files, music files, or other computer files) hosted by the origin server 130.

Examples of an origin server 130 include computing devices that may serve and/or generate network resources (e.g., web pages, images, word processing documents, PDF files, movie files, music files, or other computer files). Origin server 130 may also be another edge server to the server that serves and/or generates network resources. Although not illustrated in FIG. 1, the network resources of origin server 130 may be stored separately from the device that responds to the requests.

Distributed cloud computing network 115 includes data centers 110A-N that are geographically distributed. Each of data centers 110A-N includes one or more compute servers and is a regional leader for its respective region. For example, data center 110A includes compute servers 120A-C, data center 110B includes compute servers 122A-C, and data center 110N includes compute servers 124A-C. Each data center can also include one or more control servers, one or more DNS servers (e.g., one or more authoritative name servers, one or more proxy DNS servers), and/or one or more other pieces of network equipment such as router(s), switch(es), and/or hubs.

The compute servers in each of the data centers 110A-N can be arranged as a hierarchical node tree. For example, data center 110A can include a first compute server (e.g., compute server 120A) at a first, and lowest, hierarchical level of the node tree, a second compute server (e.g., compute server 120B) at a second hierarchical level of the node tree, and a third compute server (e.g., compute server 120C at a third, and highest, hierarchical level of the node tree. Compute server 122A, compute server 122B, and compute server 122C in data center 110B and compute server 124A, compute server 124B, and compute server 124C data center 110N may be arranged in a similar configuration. While FIG. 1 illustrates a single compute server at each hierarchical level of the node tree, in other embodiments, there may be multiple compute servers at the first and second hierarchical levels within a single data center.

In some embodiments, when client devices 105A-N generate requests 140A-N directed to the origin server 130, the requests 140A-N are directed to or received by a compute server of one of the data centers of the distributed cloud computing network 115. For example, the domain of the application or resource may resolve to IP address(es) of the distributed cloud computing network 115 (which may be anycast IP address(es)). The particular data center that receives a particular IP packet from a client device may be determined by the network infrastructure according to an Anycast implementation or by a geographical load balancer. For instance, the data centers 110A-N may each advertise the same anycast IP address for the origin server 130. An IP packet with a destination IP address of that anycast IP address may be received at the data center that is closest to the requesting client device in terms of routing protocol configuration (e.g., Border Gateway Protocol (BGP) configuration) according to an anycast implementation as determined by the network infrastructure (e.g., router(s), switch (es), and/or other network equipment) between the requesting client device and the data centers.

In some embodiments, each compute server is configured to act as a broker within the hierarchical node tree, to aggregate, forward, and/or manage state information related to request counters. For example, compute server 120A acts as a first broker at the lowest tier of the hierarchical node tree that receives write requests (e.g., requests 140A-N) from client devices (e.g., client devices 105A-N) or edge processes. Compute server 120A can maintain a buffer storing a counter value representing a local state of received write requests. Compute server 120A also stores counter values in a local cache of counter data structures, each indexed by a unique counter identifier. In such embodiments, compute server 120A is configured to process incoming requests by incrementing or decrementing the counter value associated with a specific key corresponding to a received request. In some embodiments, compute server 120A increments or decrements the counter value associated with a specific key corresponding based on the number of write requests received by compute server 120A. Compute server 120A can then transmit the updated counter value in an upstream transmission to its parent node (e.g., compute server 120B at the second hierarchical level) along path 130A. In some embodiments, the upstream transmission includes accumulated totals. In other embodiments, the upstream transmission can be the entire aggregated counter state. In some embodiments, compute server 120A pushes these updates to compute server 120B when batch thresholds or timers are triggered. In some embodiments, the counter value in the buffer is used to track the updates that will be sent upstream to a parent node. After a successful sync from compute server 120A to compute server 120B, the counter values in the local buffer of counter data structures at compute server 120A can be reset (e.g., flushed). However the local cache is maintained, which allows the compute server to be able to serve read/write requests for the same keys faster.

Compute server 120B acts as a second broker at the second tier of the hierarchical node tree. Compute server 120B can aggregate batched updates received from multiple brokers at the first hierarchical level, such as compute server 120A and its peers within the same colocation region. Compute server 120B may consolidate the updates from the one or more compute servers that are children of compute server 120B. In such embodiments, these updates are reflected in the local cache of compute server 120B and are also appended to a batched buffer which is used to send the new updates to the parent (e.g., compute server 120C). The buffer is reset after a successful sync with the parent.

Compute server 120B then pushes the updates upstream to its parent compute server (e.g., compute server 120C at the third hierarchical level) along path 130B. In some embodiments, compute server 120B pushes these updates to compute server 120C when a trigger event occurs (e.g., a batch thresholds or a periodic timer is reached). In some embodiments, the system implements an adaptive backoff mechanism configured to regulate the frequency of upstream transmissions based on network conditions and parent node load. The backoff mechanism dynamically adjusts the interval between successive update transmissions (e.g., the length of the periodic timer) in response to detecting congestion or elevated processing demand at a parent compute server. In response to detecting improving conditions, the compute server reduces the delay to restore normal update cadence. This adaptive backoff strategy prevents excessive network traffic, mitigates the risk of overwhelming upstream nodes, and ensures stable propagation of state information across the hierarchical node tree while maintaining eventual consistency.

Compute server 120C acts as a third broker at the third tier of the hierarchical node tree. Compute server 120C is a regional leader that aggregates states from all the second brokers within its region into a regional counter value for its entire region at data center 110A. In some embodiments, compute server 120C does a max merge operation. In such embodiments, performing the max_merge operation can guarantee idempotency since merging the same state multiple times has no additional effect. Compute server 120C then exchanges this regional state information with peer third brokers (e.g., other regional leaders of other regions) to compute a global counter state. For example, compute server 120C exchanges its regional state with the regional states of compute server 122C in data center 110B along path 132 and compute server 124C in data center 110N along path 134. Similarly, compute server 122C and compute server 124C can exchange their respective regional states. Compute server 120C can then compute the global state for each counter by combining its regional state with all peer regional states. In some embodiments, compute server 120C employs conflict-free replicated data types (CRDTs), such as PN counters, to ensure idempotent and commutative merging of updates, as well as eventual consistency.

After computing the global state for a counter, compute server 120C propagates the computed global state downstream to compute server 120B along path 130C. In some embodiments, compute server 120C propagates the regional state for all of the data centers that are part of the same region as data center 110A and the global state. Compute server 120B can then propagate the global state to compute server 120A along path 130D. The compute servers at the first and second hierological levels may then cache the global state for the counter. Compute server 120B, at the second hierological level, may also cache the aggregated local state (e.g., compute intermediates states for all compute servers that compute server 120B is a parent). This can reduce response latency for local reads.

In some embodiments, compute server 120C implements gossip-based synchronization with other compute servers in the highest tier in their respective data centers (e.g., compute server 122C and compute server 124C), where compute servers in the highest tier in their respective data centers periodically shares its local state or delta updates with other compute servers in the highest tier in other data centers. This can allow for eventual consistency by having the third brokers communicate with each other in a decentralized manner without requiring a centralized coordinator, while ensuring low-latency global propagation, fault tolerance, and scalability. In some embodiments, global propagation latency can be completed in under five seconds.

In some embodiments, the compute servers can prune stale counters based on time-to-live (TTL) values to free resources and prevent unnecessary replication. The TTL may be measured from the time of the first write or from the most recent update. In some embodiments, the TTL can be configured by the client/customer or can be set to a default value (e.g., one minute). For example, a rate limiting module can define the TTL value for a counter based on corresponding rate limiting rules configured by the client. The compute servers can periodically evaluate counters against their TTL and remove expired counters to free resources and reduce replication overhead.

In some embodiments, each the compute servers are each level of the hierarchical node tree implements specific restart and bootstrapping logic to maintain consistency following a failure or system restart. For example, when a compute server at any hierarchical level experiences a restart, the compute server may initiate a bootstrapping process to retrieve the most recent global state from its parent or peer nodes before resuming normal operation. During bootstrapping, the compute server may buffer incoming updates or temporarily reject requests to prevent propagation of stale state. To mitigate data inconsistency caused by network failures, the compute servers at the third layer can implement an idempotent merge protocol. Specifically, taking the maximum of the incoming data and the current state ensures that the cumulative state is invariant under repeated retries of the same update, thus providing a solution that allows for multiple retries without requiring complex deduplication overhead. In the event of a network partition, compute servers operate in a degraded mode using the last known global state combined with uncommitted local updates to make provisional decisions until connectivity is restored. In some embodiments, when a compute server at the first tier (e.g., compute server 120A) restarts, it does not require bootstrapping because it only processes raw increment and decrement operations locally. However, any buffered updates that were not propagated upstream prior to the restart may be lost. In contrast, a compute server at the second tier (e.g., compute server 120B) must bootstrap by requesting the current global state from its parent compute server (e.g., compute server 120C) before resuming normal operation. During this bootstrapping process, the compute server at the second tier may temporarily buffer incoming updates or reject requests to prevent propagation of stale state. Similarly, a compute server at the third tier (e.g., compute server 120C) bootstraps by synchronizing with peer third tier brokers to refresh its CRDT-based state. In such embodiments, this ensures that the compute server at the third tier can accurately compute global state before propagating updates downstream. In some scenarios, simultaneous restarts of multiple brokers, such as a compute server at the second tier and its child compute servers, may result in temporary inconsistencies or loss of buffered increments until the system converges on the previously known maximum state. These restart procedures ensure eventual consistency across the hierarchical node tree and prevent propagation of outdated or incomplete state information.

In some embodiments, compute servers at the first and second hierarchical levels (e.g., compute server 120A and compute server 120B) can maintain a snapshot of the most recent global state along with a list of uncommitted updates that have not yet been propagated upstream. If there is a sync failure (e.g., errors while talking upstream), these uncommitted updates can be merged with the new incoming updates to build a consolidated message and sent upstream (retried) on the next sync. This ensures that writes that are not successful are not completely lost.

In some embodiments, to prevent duplicate counting caused by retries, compute servers at the third hierarchical level (e.g., compute server 120C) can perform a max-merge( ) operation where the max( ) value always wins. This mechanism can ensure correctness and prevents double counting in scenarios involving transient network failures or retry logic.

In some situations, compute server 120C at the third level can become isolated from its peer (e.g., other compute servers at the third level of their respective data centers). In such situations, compute server 120C can continue to compute global state based on its regional data and the last known global state. Similarly, a compute server at the second level that cannot connect to its parent compute server may fail over to an alternate compute server (e.g., in a different data center) or operate using its local state until connectivity is restored. This can ensure high availability and eventual consistency even under network partition.

In some embodiments, the counter updates that are sent between the different hierarchical levels of the node tree are batched. In such embodiments, batching a plurality of messages into one consolidated message enables the data to be sent using less network bandwidth.

Figure 2:
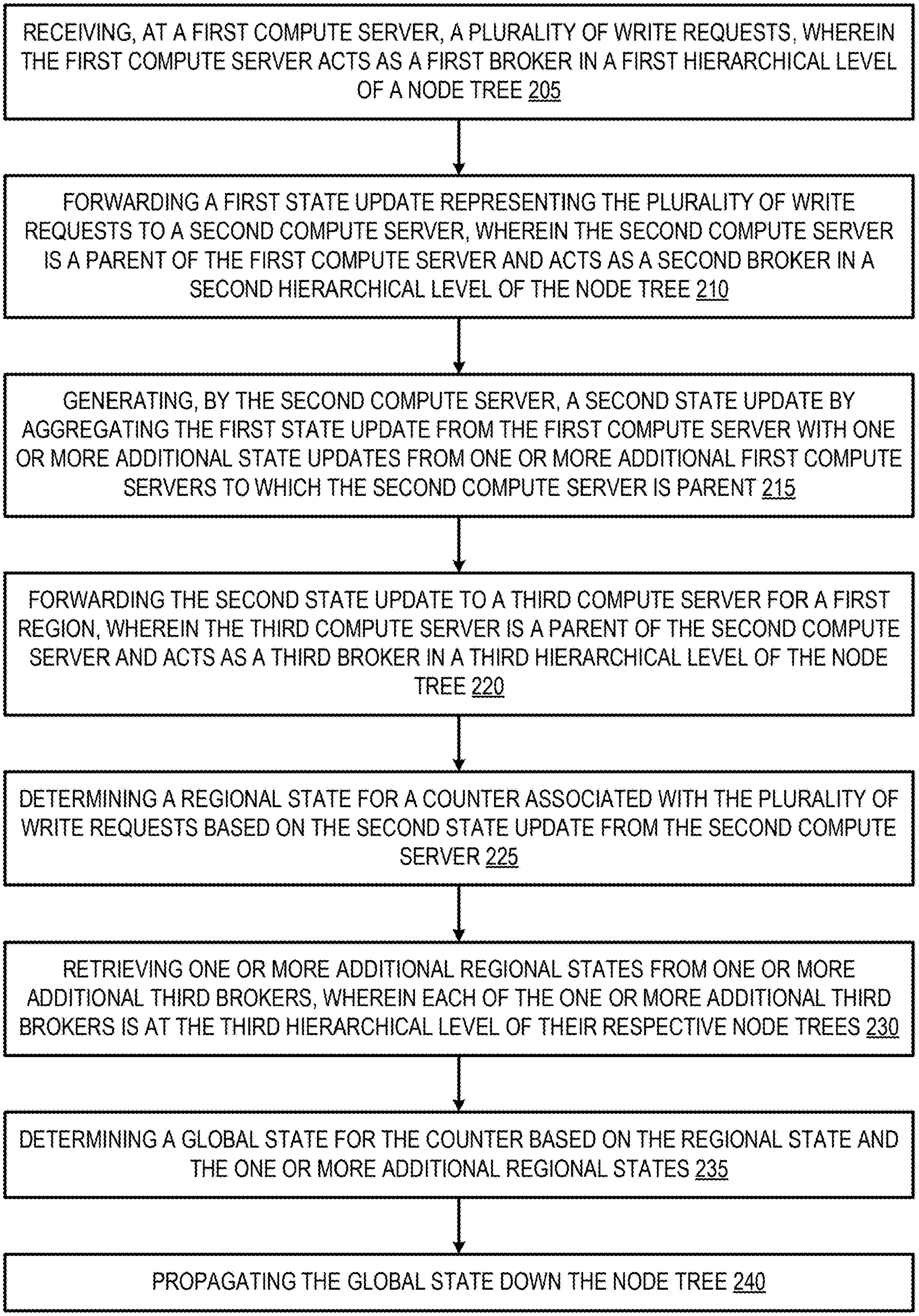
FIG. 2 is a flow diagram that illustrates exemplary operations of a method for determining a global state of write requests through hierarchical request aggregation within and across data centers according to an embodiment.

FIG. 2 is a flow diagram that illustrates exemplary operations of a method for determining a global state of write requests through hierarchical request aggregation within and across data centers according to an embodiment. The operations of FIG. 2 will be described with reference to the exemplary embodiment of FIG. 1. However, the operations of FIG. 2 can be performed by embodiments other than those discussed with reference to FIG. 1, and the embodiments discussed with reference to FIG. 1 can perform operations different than those discussed with reference to FIG. 2. The operations of FIG. 2 are described as being performed by one or more compute servers (e.g., compute servers 120A-C) of a data center (e.g., data center 110A) of a distributed cloud computing network (e.g., distributed cloud computing network 115).

In operation 205, a first compute server of a data center receives a plurality of write requests, wherein the first compute server acts as a first broker in a first hierarchical level of a node tree. The plurality of write requests may include requests for an action to be performed a resource hosted at an origin server. The plurality of write requests can be received from one or more requesting client devices. Examples of requesting client devices include computing devices (e.g., laptops, desktops, workstations, smartphones, palm tops, mobile phones, tablets, gaming systems, set top boxes, wearable devices, internet-of-things (IoT) devices, electronic devices, etc.) that are capable of transmitting and/or receiving network traffic. In some embodiments, the requesting client device executes a client network application that is capable of transmitting and/or receiving network traffic. For example, the client network application may be a web browser or other application that can access network resources (e.g., web pages, images, word processing documents, PDF files, movie files, music files, or other computer files).

In some embodiments, the first compute server increments a first counter value in a local buffer based on the number of the plurality of write requests it receives. In some embodiments, counter value is updated in a first come, first serve basis.

In operation 210, the first compute server forwards a first state update representing the plurality of write requests to a second compute server of the data center, wherein the second compute server is a parent of the first compute server and acts as a second broker in a second hierarchical level of the node tree. In some embodiments, the first compute server forwards the first state update to the second compute server in response to determining that a trigger event has been reached. In some embodiments, the trigger event may be the first counter value reaching a threshold value or a significant change in a local state. In other embodiments, the trigger event may be an expiration of a periodic timer.

When the trigger event is reached, the first compute server generates a counter update message with the first counter value and sends the counter update message to the second compute server. After the counter update message has been successfully sent to the second compute server, the first compute server may then flush the local buffer storing the updates on a successful send. In such embodiments, this prevents the first compute server from sending the first counter value more than once. In some embodiments, the first compute server also maintains a local cache of all the counter updates so that it is able to service read requests for hot keys.

In operation 215, the second compute server generates a second state update by aggregating the first state update from the first compute server with one or more additional state updates from one or more additional first compute servers to which the second compute server is parent. In some embodiments, the second compute server is a parent to multiple first compute servers at the first hierarchical level of the node tree. In such embodiments, the second compute server may receive separate state updates from each of the one or more additional first compute servers for their respective counters.

In operation 220, the second compute server forwards the aggregated state to a third compute server for a first region, wherein the third compute server is a parent of the second compute server and acts as a third broker in a third hierarchical level of the node tree. The first region includes the compute servers at the first hierarchical level and the second hierarchical level of the node tree. The first region is one of a plurality of regions. In some embodiments, the second compute server forwards the second state update to the third compute server when a trigger event is reached (e.g., a counter value threshold or expiration of a periodic timer).

In operation 225, the third compute server determines a regional state for a counter associated with the write requests based on the second state update from the second compute server. Where there are multiple second compute servers at the second hierarchical level of the node tree, the third compute server may receive separate counter updates from each of the multiple second compute servers. In such embodiments, the third compute server can aggregate the counter updates from the multiple second compute servers to determine the regional state for the counter associated with the write requests.

In operation 230, the third compute server retrieves one or more additional regional states from one or more additional third brokers, wherein each of the one or more additional third brokers is at the third hierarchical level of their respective node trees. In some embodiments, the third compute server contacts peers (e.g. other regional leaders) in other data centers in other regions (e.g., other compute servers at a same hierarchical level as the third compute server) to receive a current regional state for a counter associated with the write requests of each of the other data centers.

In some embodiments, the counters include information about their respective replication type (e.g., regional or global). Regional leaders will sync with other regional leaders only for counter keys that are configured with a replication type of "global." Thus, if the replication type for a counter key is "regional," the updates for that counter key do not go beyond the respective region (e.g., they are not synced between the regional leaders).

In operation 235, the third compute server determines a global state for the counter based on the regional state and the one or more additional regional states. In some embodiments, the third compute server determines the global state for the counter by aggregating the regional state of the counter for the data center in which the third compute server resides with the one or more additional regional states from one or more additional third brokers.

In operation 240, the third compute server propagates the global state down the node tree. The first compute server and second compute server at the lower levels of the node tree maintains a map of the global state for a plurality of counters. Based on the global state associated with the write requests, the global state for the corresponding counter is updated at the first compute server and the second compute server.

Figure 3:
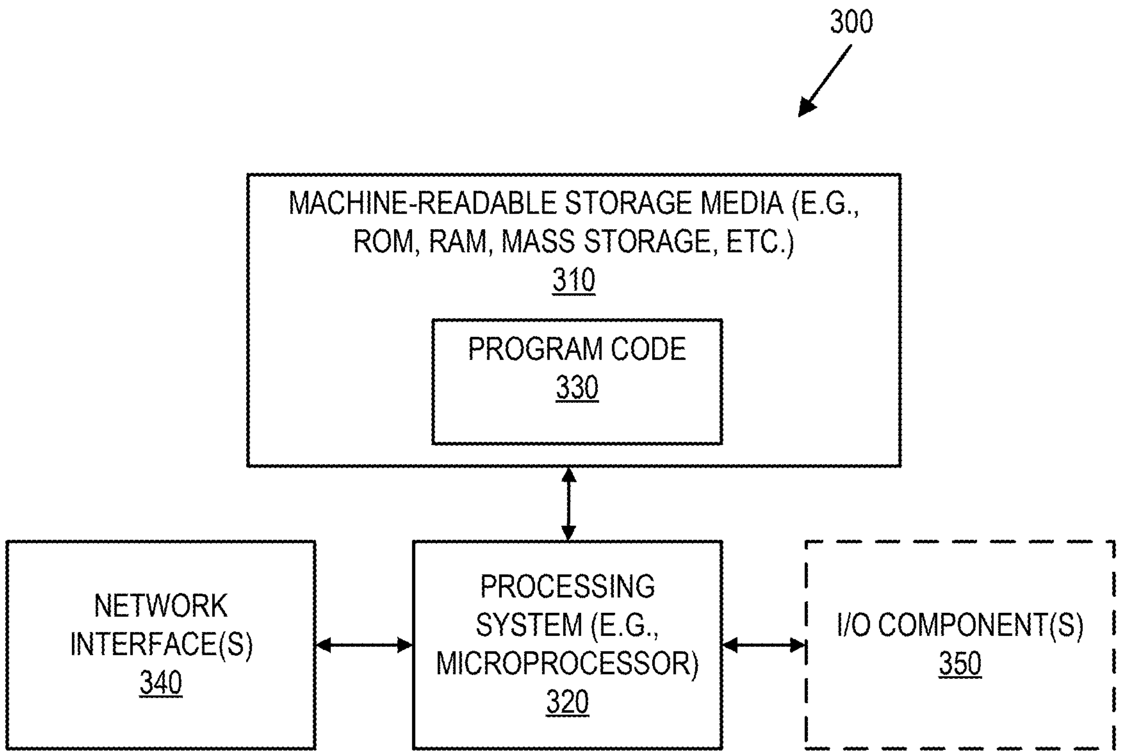
FIG. 3 illustrates a block diagram for an exemplary data processing system that may be used in some embodiments.

FIG. 3 illustrates a block diagram for an exemplary data processing system 300 that may be used in some embodiments. One or more such data processing systems 300 may be used to implement the embodiments and operations described with respect to the edge server, the data centers, or other electronic devices. The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory, and other non-transitory computer-readable media) and machine-readable transmission media (also called a carrier) (e.g., electrical, optical, radio, acoustical or other form of propagated signals—such as carrier waves, infrared signals), which is coupled to the processing system 320 (e.g., one or more processors and connected system components such as multiple connected chips). For example, the depicted machine-readable storage media 310 may store program code 330 that, when executed by the processing system 320, causes the data processing system 300 to perform any of the operations described herein.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output ("I/O") components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the data processing system 300, and, in certain embodiments, fewer components than that shown in FIG. 3 may also be used in a data processing system 300. One or more buses may be used to interconnect the various components shown in FIG. 3.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:

receiving, at a first compute server, a plurality of write requests, wherein the first compute server acts as a first broker in a first hierarchical level of a node tree;

forwarding, by the first compute server, a first state update representing the plurality of write requests to a second compute server, wherein the second compute server is a parent of the first compute server and acts as a second broker in a second hierarchical level of the node tree;

generating, by the second compute server, a second state update by aggregating the first state update from the first compute server with one or more additional state updates from one or more additional first compute servers to which the second compute server is parent;

forwarding, by the second compute server, the second state update to a third compute server for a first region, wherein the third compute server is a parent of the second compute server and acts as a third broker in a third hierarchical level of the node tree;

determining, by the third compute server, a regional state for a counter associated with the plurality of write requests based on the second state update from the second compute server;

retrieving, by the third compute server, one or more additional regional states from one or more additional third brokers, wherein each of the one or more additional third brokers is at the third hierarchical level of their respective node trees;

determining, by the third compute server, a global state for the counter based on the regional state and the one or more additional regional states; and propagating, by the third compute server, the global state down the node tree to the first compute server and the second compute server, wherein the first compute server and the second compute server locally cache the global state.

2. The method of claim 1, wherein the counter is associated with a TTL, and wherein upon expiration of the TTL associated with the counter, the counter is locally pruned and blocked from replication.

3. The method of claim 1, wherein receiving the plurality of write requests further comprises:

incrementing a first counter value based on a number of the plurality of write requests.

4. The method of claim 3, wherein forwarding the first state update representing the plurality of write requests to the second compute server further comprises:

determining that a trigger event has been reached for the forwarding of the first state update representing the plurality of write requests to the second compute server;

generating a counter update message with the first counter value;

sending the counter update message to the second compute server; and flushing a buffer storing the first counter value.

5. The method of claim 4, wherein the trigger event is an expiration of a periodic timer.

6. The method of claim 5, wherein determining the global state for the counter based on the regional state and the one or more additional regional states further comprises:

performing a max-merge operation on the regional state and the one or more additional regional states.

7. The method of claim 1, wherein retrieving the one or more additional regional states from the one or more additional third brokers further comprises:

periodically receiving updates representing changes to the one or more additional regional states from the one or more additional third brokers; and periodically transmitting updates representing changes to the regional state to the one or more additional third brokers.

8. A non-transitory machine-readable storage medium that provides instructions that, if executed by a processing system of an edge server of a plurality of edge servers of a distributed cloud computing network, will cause said edge server to perform operations comprising:

receiving, at a first compute server, a plurality of write requests, wherein the first compute server acts as a first broker in a first hierarchical level of a node tree;

forwarding, by the first compute server, a first state update representing the plurality of write requests to a second compute server, wherein the second compute server is a parent of the first compute server and acts as a second broker in a second hierarchical level of the node tree;

generating, by the second compute server, a second state update by aggregating the first state update from the first compute server with one or more additional state updates from one or more additional first compute servers to which the second compute server is parent;

forwarding, by the second compute server, the second state update to a third compute server for a first region, wherein the third compute server is a parent of the second compute server and acts as a third broker in a third hierarchical level of the node tree;

determining, by the third compute server, a regional state for a counter associated with the plurality of write requests based on the second state update from the second compute server;

retrieving, by the third compute server, one or more additional regional states from one or more additional third brokers, wherein each of the one or more additional third brokers is at the third hierarchical level of their respective node trees;

determining, by the third compute server, a global state for the counter based on the regional state and the one or more additional regional states; and propagating, by the third compute server, the global state down the node tree to the first compute server and the second compute server, wherein the first compute server and the second compute server locally cache the global state.

9. The non-transitory machine-readable storage medium of claim 8, wherein the counter is associated with a TTL, and wherein upon expiration of the TTL associated with the counter, the counter is locally pruned and blocked from replication.

10. The non-transitory machine-readable storage medium of claim 8, wherein receiving the plurality of write requests further comprises:

incrementing a first counter value based on a number of the plurality of write requests.

11. The non-transitory machine-readable storage medium of claim 10, wherein forwarding the first state update representing the plurality of write requests to the second compute server further comprises:

determining that a trigger event has been reached for the forwarding of the first state update representing the plurality of write requests to the second compute server;

generating a counter update message with the first counter value;

sending the counter update message to the second compute server; and flushing a buffer storing the first counter value.

12. The non-transitory machine-readable storage medium of claim 11, wherein the trigger event is an expiration of a periodic timer.

13. The non-transitory machine-readable storage medium of claim 12, wherein determining the global state for the counter based on the regional state and the one or more additional regional states further comprises:

performing a max-merge operation on the regional state and the one or more additional regional states.

14. The non-transitory machine-readable storage medium of claim 8, wherein retrieving the one or more additional regional states from the one or more additional third brokers further comprises:

periodically receiving updates representing changes to the one or more additional regional states from the one or more additional third brokers; and periodically transmitting updates representing changes to the regional state to the one or more additional third brokers.

15. A system, comprising:

a processor; and a non-transitory machine-readable storage medium that provides instructions that, when executed by the processor, cause the processor to perform operations comprising:

receiving, at a first compute server, a plurality of write requests, wherein the first compute server acts as a first broker in a first hierarchical level of a node tree;

forwarding, by the first compute server, a first state update representing the plurality of write requests to a second compute server, wherein the second compute server is a parent of the first compute server and acts as a second broker in a second hierarchical level of the node tree;

generating, by the second compute server, a second state update by aggregating the first state update from the first compute server with one or more additional state updates from one or more additional first compute servers to which the second compute server is parent;

forwarding, by the second compute server, the second state update to a third compute server for a first region, wherein the third compute server is a parent of the second compute server and acts as a third broker in a third hierarchical level of the node tree;

determining, by the third compute server, a regional state for a counter associated with the plurality of write requests based on the second state update from the second compute server;

retrieving, by the third compute server, one or more additional regional states from one or more additional third brokers, wherein each of the one or more additional third brokers is at the third hierarchical level of their respective node trees;

determining, by the third compute server, a global state for the counter based on the regional state and the one or more additional regional states; and propagating, by the third compute server, the global state down the node tree to the first compute server and the second compute server, wherein the first compute server and the second compute server locally cache the global state.

16. The system of claim 15, wherein the counter is associated with a TTL, and wherein upon expiration of the TTL associated with the counter, the counter is locally pruned and blocked from replication.

17. The system of claim 15, wherein receiving the plurality of write requests further comprises:

incrementing a first counter value based on a number of the plurality of write requests.

18. The system of claim 17, wherein forwarding the first state update representing the plurality of write requests to the second compute server further comprises:

determining that a trigger event has been reached for the forwarding of the first state update representing the plurality of write requests to the second compute server;

generating a counter update message with the first counter value;

sending the counter update message to the second compute server; and flushing a buffer storing the first counter value.

19. The system of claim 18, wherein the trigger event is an expiration of a periodic timer.

20. The system of claim 19, wherein determining the global state for the counter based on the regional state and the one or more additional regional states further comprises:

performing a max-merge operation on the regional state and the one or more additional regional states.

21. The system of claim 15, wherein retrieving the one or more additional regional states from the one or more additional third brokers further comprises:

periodically receiving updates representing changes to the one or more additional regional states from the one or more additional third brokers; and periodically transmitting updates representing changes to the regional state to the one or more additional third brokers.

* * * * *